United States Patent Office 3,606,547
Patented Sept. 20, 1971

3,606,547
SPECTROPHOTOMETER
Kenji Iwahashi, Osaka, Japan, assignor to Shimadzu Seisakusho Ltd., Kyoto, Japan
Filed Dec. 22, 1969, Ser. No. 887,390
Claims priority, application Japan, Dec. 31, 1968, 44/731
Int. Cl. G01j 3/08, 3/42
U.S. Cl. 356—97    1 Claim

ABSTRACT OF THE DISCLOSURE

A spectrophotometer which includes an optical system arranged between the exit slit of a monochromator and the sample cell so that the meridional and sagittal image planes of the optical system are axially displaced from each other, thereby causing the bundle of monochromatic light rays to have a well defined, very thin and substantially equal cross sectional area for a long distance along the optical axis of the system. Within this distance the sample cell is placed so that the cell can be made longer than the cells used in the prior art spectrophotometers, with the cross sectional area of the bundle of monochromatic light rays passing through the sample in the cell subsantially corresponding to the cross sectional area of the sample through the whole length of the cell. This ensures efficient and accurate measurement of samples, especially those of relatively low concentrations.

---

This invention relates to a spectrophotometer and, more particularly, to a spectrophotometer which is capable of providing a bundle of monochromatic light rays having a well defined, very thin and substantially equal cross sectional area for a long distance along the optical axis of the system, within which distance a sample cell longer than those used in the prior art spectrophotometers can be placed for efficient and accurate measurement of samples.

In a typical spectrophotometer, the sample to be analyzed is put in a cell through which the light from a monochromator included in the system is passed, so that the light transmitted through or scattered by the sample is measured to know the various physical, chemical and/or biochemical properties of the sample. The sample cell is three dimensional, that is, has a predetermined height, width and length. For example, it is 8 mm. wide, 20 mm. high and 10 mm. long. In case the sample to be analyzed is of a comparatively low concentration, the cell must be long enough for any detectable absorption of the light transmitted therethrough to take place. In such a case, a cell 50 mm. or 100 mm. long is required. For efficient and accurate measurement of a sample, especially, in such a long cell as mentioned just above, it is required that the bundle of monochromatic light rays to be passed through the sample should have a cross sectional area substantially coinciding with the cross sectional area of the sample throughout the whole length thereof. Generally speaking, the exit slit of a monochromator is very narrow in width and comparatively long in height. Therefore, if an optical system substantially free from aberrations is used between the exit slit and the sample cell, it is impossible to provide such a bundle of monochromatic light rays as has substantially the same cross sectional area as that of the sample cell along the whole length thereof. This is because the meridional and sagittal image planes of such an aberrationless optical system substantially coincide so that the bundle of light rays spreads rather rapidly especially at the rear side of the image plane, and this prevents use of a long sample cell.

If cylindrical lenses are used in a suitable arrangement between the exit slit of the monochromator and the sample cell, it may be possible to provide a bundle of monochromatic light rays having a substantially equal cross sectional area over a considerably long distance along the optical axis of the system. This arrangement, however, requires many lenses which not only reduce the light energy to be used for measurement but also introduce chromatic aberration into the system. Obviously these must be avoided in the spectrophotometers.

Accordingly, the primary object of the invention is to provide a spectrophotometer in which the bundle of output light rays from the monochromator included in the apparatus has a well defined, very thin and substantially equal cross sectional area for a considerable distance along the optical path of the system.

Another object of the invention is to provide a spectrophotometer in which the bundle of output light rays from a monochromator included in the apparatus has a substantially equal cross sectional area which substantially coincides with the cross sectional area of the sample to be analyzed throughout the whole length thereof.

Still another object of the invention is to provide a double-beam spectrophotometer in which the bundle of output light rays from a monochromator included in the apparatus has a substantially equal cross sectional area substantially coinciding with the cross sectional area of each of the reference and sample cells throughout the whole length thereof.

A further object of the invention is to provide such a spectrophotometer as aforesaid in which the reference and the sample beams are completely equivalent so that no compensation of the 100% line need be required.

The objects of the invention is achieved by providing between the exit slit of the monochromator and the cell an optical system so arranged that the meridional and sagittal image planes thereof are deliberately displaced axially from each other. The optical system includes at least one optical element which may be either convergent or divergent. The optical element may be either a lens or mirror, but the latter is preferred because there is no problem of chromatic aberration. The displacement of the meridional and sagittal image planes of the optical element can be effected by disposing the optical element in the optical path of the monochromatic light in such a manner that the axis of the element lies aslant, that is, making a predetermined angle with the axis of the optical path. By deliberately introducing a suitable amount of displacement of the sagittal and meridional image planes of the optical system, it is possible to cause the bundle of monochromatic light rays to have a well defined, relatively thin and substantially equal cross sectional area over a considerably long distance along the optical path of the system, within which distance a cell fairly longer than in the prior art can be placed for accurate and efficient measurement of low-concentration samples. Such "off-axis" arrangement of the optical system as mentioned just above will cause coma to be introduced into the system. This coma, however, can be eliminated by placing a second optical element of the same or similar characteristics as the first-mentioned optical element in the optical path of the system in such a manner that the coma caused by the first optical element is offset by the coma in the opposite direction caused by the second optical element. If the optical element is of a reflecting type, no chromatic aberration is introduced into the system.

The invention with its above-mentioned and other objects, features and advantages will become apparent from the following description of some preferred embodiments thereof with reference to the accompanying drawing, wherein the same reference numerals denote corresponding parts and wherein.

Figure 1:
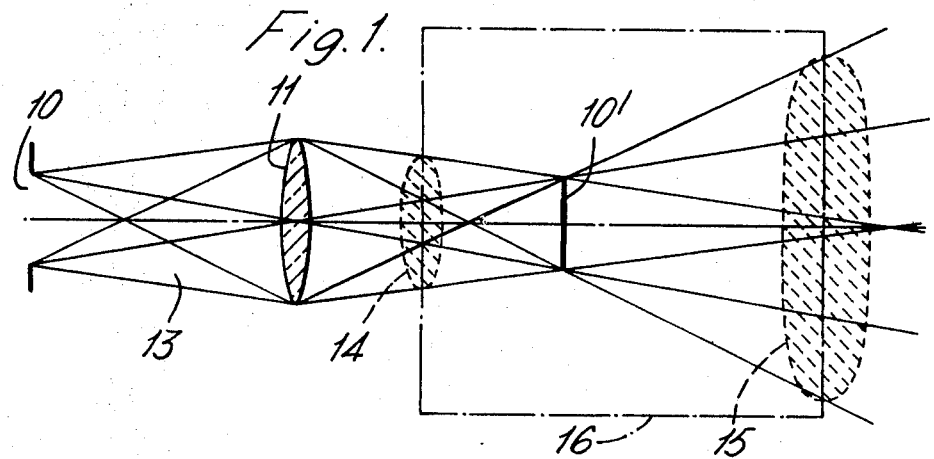
FIG. 1 is a schematic view showing the relation between the exit slit of a monochromator and its image when an optical element free from aberrations is employed.

Now referring in detail to the drawing, first to FIG. 1, the numeral 10 designates a slit of a monochromator, not shown, of any conventional type. The monochromatic light coming out of the slit 10 passes through an optical element 11 substantially free from aberrations to focus the image of the exit slit as at 10′. The bundle 13 of monochromatic light rays has cross sectional areas 14 and 15 at the front and rear sides of the image 10′, respectively. The cross sectional areas 14 and 15 differ considerably from each other. This means that the bundle of output light rays from the monochromator slit 10 cannot have a substantially equal cross sectional area for a considerably long distance along the optical axis near the image 10′ of the exit slit where the sample cell is positioned. In other words, the sample cell can only have a very small longitudinal dimension if the bundle of monochromatic light rays to be passed through the cell should have a substantially equal cross sectional area throughout the whole length of the cell. If the sample cell should have a sufficient length, it must be as large in volume as shown by dashed lines 16 in FIG. 1. Such a voluminous cell, however, has various drawbacks such as: that a large amount of sample is required for measurement; that the bundle of monochromatic light rays cannot uniformly pass through each and every portion of the sample; and that the light rays have different path lengths in the sample they pass through, with resulting decrease in accuracy of measurement. These drawbacks obviously are detrimental to accurate and efficient measurement of samples.

Figure 2:
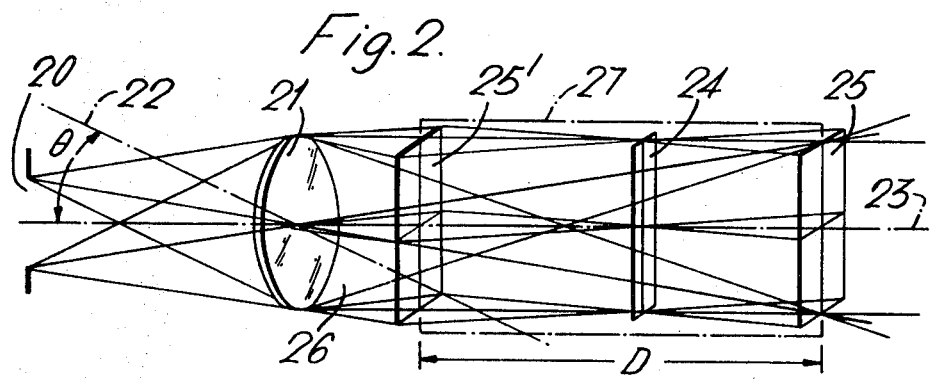
FIG. 2 is a schematic view similar to FIG. 1 when the meridional and sagittal image planes of the optical element are deliberately displaced axially from each other in accordance with the principle of the invention.

FIG. 2 schematically shows the principle of the invention. An optical element 21 is so arranged that its axis 22 lies aslant, that is, making a predetermined angle θ with the optical axis 23 of the monochromatic light emerging from the exit slit 20 of a monochromator. Therefore, the monochromatic light enters the optical element 21 from off the axis thereof, so that the meridional rays focus at a plane 24 (to be referred to hereinafter as the meridional image plane) and the sagittal rays, at a different plane 25 (to be referred to hereinafter as the sagittal image plane) which is axially displaced from the meridional image plane. With such displacement of the meridional and sagittal image planes of the optical element 21, the bundle of monochromatic light rays 26 passing through the element 21 has a well defined, relatively thin and substantially equal across sectional area over a considerably long distance along the optical axis 23, and a sample cell such as shown by dashed lines 27 may be used. The sample cell 27 extends between the sagittal image plane 25 and another plane 25′ in which the bundle of monochromatic light rays 26 has substantially the same cross sectional area as it has in the plane 25. The angle θ which the axis 22 of the optical element 21 makes with the optical axis 23 and the curvatures of the surfaces of the element 21 are so determined that the plane 25′ is positioned at as great a distance D forwardly from the sagittal plane 25 as possible. It is obvious that the cell 27 in FIG. 2 has the same length as the cell 16 in FIG. 1, but is far smaller in volume than the latter cell 16, so that the previously mentioned drawbacks of the cell 16 can be completely eliminated.

Figure 3A:
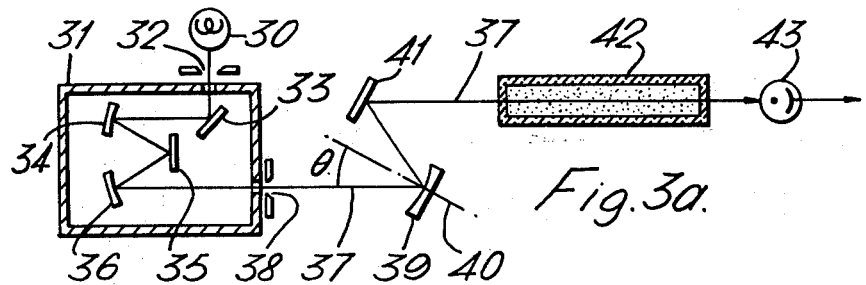
FIGS. 3a to 3c are schematic views of different embodiments of the spectrophotometer constructed in accordance with the invention.

Turning now to FIG. 3a which shows the general layout of one embodiment of the invention, there is shown a light source 30, the light from which enters a monochromator 31 through an entrance slit 32 and is reflected by a plane mirror 33 to impinge on a collimating mirror 34, which renders the light rays parallel and directs them to a grating 35. The grating disperses the light rays into different wavelengths, among which a selected one is focussed by a telemating mirror 36 on an exit slit 38. This monochromatic light advances along an optical axis 37 onto a concave mirror 39. The concave mirror 39 is so arranged that its axis 40 lies aslant, that is, making a predetermined angle θ with the optical axis 37 of the output monochromatic light. The light reflected by the mirror 39 is directed by a plane mirror 41 toward a sample cell 42.

As previously mentioned, the bundle of light rays reflected by the concave mirror 40 arranged aslant in the above-mentioned manner has a well defined, very thin and substantially equal cross sectional area over a considerable distance along the optical axis 37. Within that distance the sample cell 42 is positioned so that the cross sectional area of the bundle of monochromatic light rays may substantially coincide with that of the sample cell through the whole length thereof. The light transmitted through the sample in the cell 42 is then received by a photodetector 43 such as a photomultiplier tube.

Figure 3B:
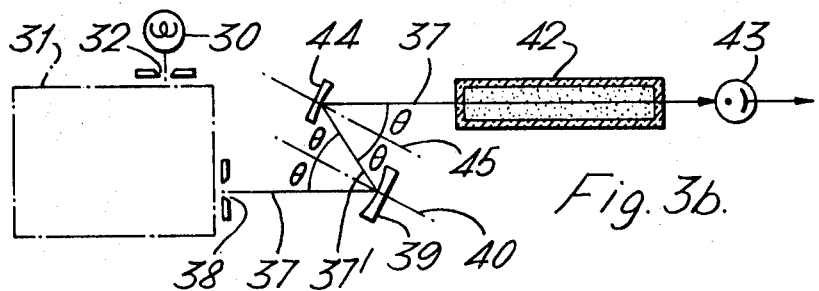

The mirror 39 disposed aslant to the optical axis 37 in the abovementioned manner will sometimes introduce into the system a large coma, which must be eliminated. Directed toward achieving this end is the arrangement of FIG. 3b, wherein the same reference numerals as in FIG. 3a denote corresponding parts. In FIG. 3b the plane mirror 41 in FIG. 3a is replaced by a second concave mirror 44 of the same or similar characteristics to the mirror 39. The mirror 44 is so arranged that its axis 45 lies in parallel with the axis 40 of the mirror 39, with the reflecting surfaces of the two mirrors 39 and 44 being in an opposed relation to each other, so that the coma induced by the first mirror 39 is offset by the coma in the opposite direction caused by the second mirror 44. Here, the word "parallel" also includes the situation that the two axes 40 and 45 coincide.

Figure 3C:
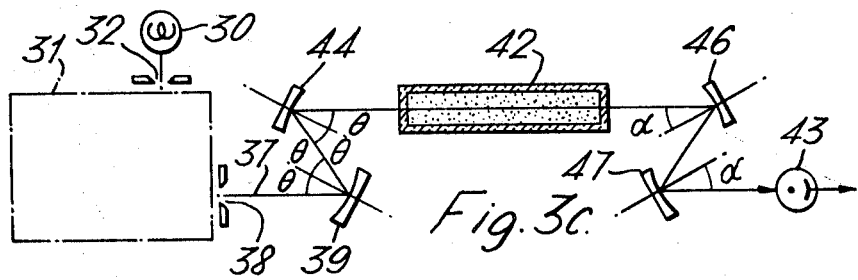

In spectrophotometers, the light transmitted through the sample is generally received by a photosensitive device such as a photomultiplier tube. In this case, it is required that all the light energy passing through the sample should be received by the photosensitive surface of the tube, and that the light should fall evenly and uniformly on the whole effective photosensitive surface of the tube in order to eliminate errors caused by the local difference in sensitivity of the photosensitive surface. The arrangement of FIG. 3c is directed toward meeting these requirements. In FIG. 3c the same reference numerals as in FIG. 3a or 3b denote corresponding parts. Between the sample cell 42 and photomultiplier tube 43 there are arranged a second pair of concave mirrors 46 and 47 in the same relation as the first pair of mirrors 39 and 44. The curvatures and angle α of the mirrors 46 and 47 are so determined that all the light transmitted through the sample in the cell 42 may fall evenly and uniformly on the whole photosensitive surface of the photomultiplier tube 43.

One of the second pair of concave mirrors 46 and 47 may be replaced by a simple plane mirror, or both may be replaced by any suitable optical element or system that can achieve the same result as the pair of mirrors 46 and 47.

Figure 4:
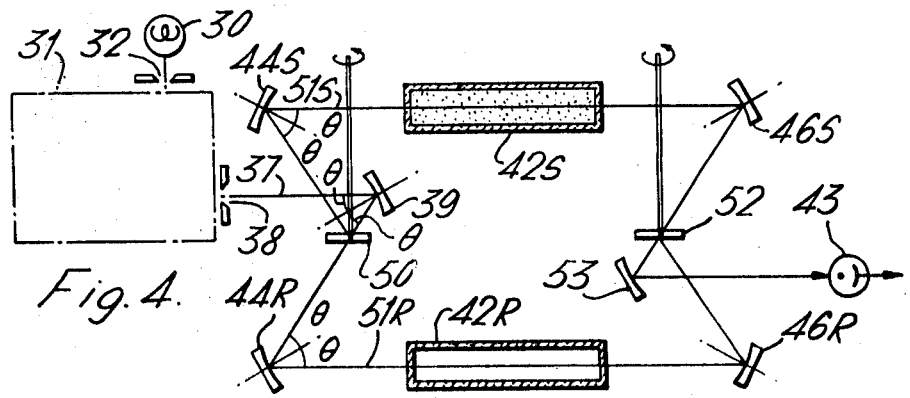
FIG. 4 is a schematic view of a double-beam spectrophotometer constructed in accordance with the invention.

This invention may advantageously be applied to a double-beam spectrophotometer. FIG. 4 shows a general layout of a double-beam spectrophotometer constructed in accordance with the invention. The monochromatic light 37 from the monochromator 31 is reflected by a concave mirror 39 disposed in a predetermined angular relation to the optical axis 37 similar to that of the mirrors 39 in FIGS. 3a, 3b or 3c. A reflecting chopper 50 causes the monochromatic light reflected by the mirror 39 to be directed alternately to concave mirrors 44R and 44S along a pair of paths 51R and 51S, respectively. The light beams along the paths 51R and 51S will hereinafter be referred to as the reference beam and the sample beam, respectively. The mirrors 44R and 44S are disposed symmetrically at the opposite sides of the chopper 50, and each of the mirrors 44R and 44S is arranged with its axis making a predetermined angle θ with the optical axis 51R or 51S. It is easily seen that the relative position of the mirrors 39 and 44R and that of the mirrors 39 and 44S with the chopper 50 therebetween are the same as the relative position of the corresponding mirrors in FIGS. 3b or 3c. The reference and sample beams 51R and 51S then passes through reference and sample cells 42R and 42S to impinge on concave mirrors 46R and 46S, respectively. The reflected light beams from the mirrors 46R and 46S are caused by a second reflecting chopper 52, which is rotated in synchronism with the previously mentioned chopper 50, to alternately impinge on a concave mirror 53, which collects the light onto the photosensitive surface of a photomultiplier tube 43. The mirrors 46R and 46S are symmetrically arranged at the opposite sides of the chopper 52. It will be easily seen that the mirrors 46S and 53 and the mirrors 46R and 53 with the reflecting chopper 52 functionally correspond to the mirrors 46 and 47 in FIG. 3c. The concave mirror 53 may be replaced by a simple plane mirror just as in FIG. 3.

Figure 5:
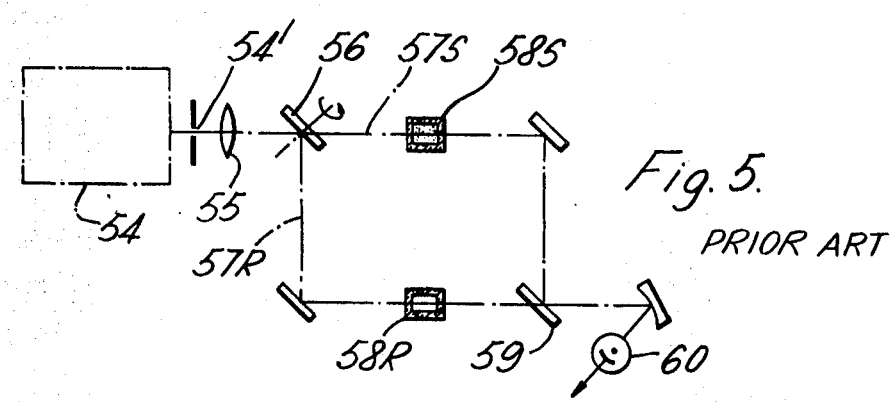
FIG. 5 is a schematic view of a conventional double-beam spectrophotometer.

The double-beam spectrophotometer of FIG. 4 has various advantages such as: that since the optical elements employed in the system are all reflectors, no chromatic aberration is introduced; that since the reference and sample beams are equivalent, the absorbance of the sample can be measured without any compensation to be made; that with the "off-axis" arrangement of the concave mirrors 39, 44R and 44S, both the reference and sample beams have a well defined, very thin and substantially equal cross sectional area throughout the whole length of the cells, which can be as long as 100 mm.; and that since the output light from the monochromator is alternately caused by the time-sharing method to advance along the reference and sample paths, 100% of the light energy can be utilized for purposes of measurement. The advantages are obvious when the spectrophotometer of FIG. 4 is compared with a conventional double-beam spectrophotometer as schematically shown in FIG. 5. Here, the light from a monochromator 54 is passed through a lens 55 and then caused by a chopper 56 to alternately advance along reference and sample paths 57R and 57S to pass through reference and sample cells 58R and 58S. The lens 55 introduces chromatic aberration into the system, and is arranged coaxially with the optical path of the monochromatic light so that the cells cannot be made very long. The lengths of the optical paths of the reference and sample beams 57R and 57S from the exit slit 54' to the cells 58R and 58S differ materially so that the two beams are not equivalent.

Moreover, a half-mirror 59 is used to direct the two beams onto a photomultiplier tube 60, so that a considerable loss of the transmitted light energy cannot be avoided.

What I claim is:

1. A double-beam spectrophotometer comprising: means for providing a bundle of monochromatic light rays; a first optical means including a first concave mirror arranged in such a manner that the meridional and sagittal image planes of said concave mirror are axially displaced so that said bundle of monochromatic light rays has a well defined, thin and substantially equal cross section for a predetermined distance, the axis of said first concave mirror making a predetermined angle with the optical axis of said monochromatic light rays, a first chopper means for causing said monochromatic light rays from said first concave mirror to advance alternately along a first and a second optical path which are symmetrical with each other, a first cell disposed in said first optical path within said predetermined distance, a second cell disposed in said second path within said predetermined distance, said first optical means also including a second concave mirror disposed in said first optical path between said first concave mirror and said first cell, said second concave mirror being so arranged that its axis lies in parallel with the axis of said first concave mirror with the reflecting surfaces of said first and second concave mirrors being in an opposed relation to each other, said first optical means also including a third concave mirror disposed in said second optical path between said first concave mirror arnd said second cell, said third concave mirror being arranged symmetrically with said second concave mirror with respect to said chopper means, the reflecting surfaces of said first and third concave mirrors being in opposed relation to each other, said concave mirrors thus being arranged so that any coma induced by said first concave mirror is offset in said first optical path by said second concave mirror and in said second optical path by the coma induced by said third concave mirror, a photomultiplier tube for converting light energy to a corresponding electrical signal and a second optical means for causing the light transmitted through said first and second cells to alternately actuate said photomultiplier tube and arranged so as to apply substantially all the light energy transmitted through said first and second cells uniformly and evenly onto the whole photosensitive surface of said photomultiplier tube.

References Cited

UNITED STATES PATENTS 3,022,704 2/1962 Cary _____ 356—94
3,071,037 1/1963 Brumley _____ 250—220X RONALD L. WIBERT, Primary Examiner F. L. EVANS, Assistant Examiner U.S. Cl. X.R.

356—95